May 22, 1928. 1,670,820
W. A. O'TOOLE
AUTOMATIC LUBRICATOR FOR DRIVING WHEELS OF LOCOMOTIVES
Filed Oct. 6, 1925 2 Sheets-Sheet 1
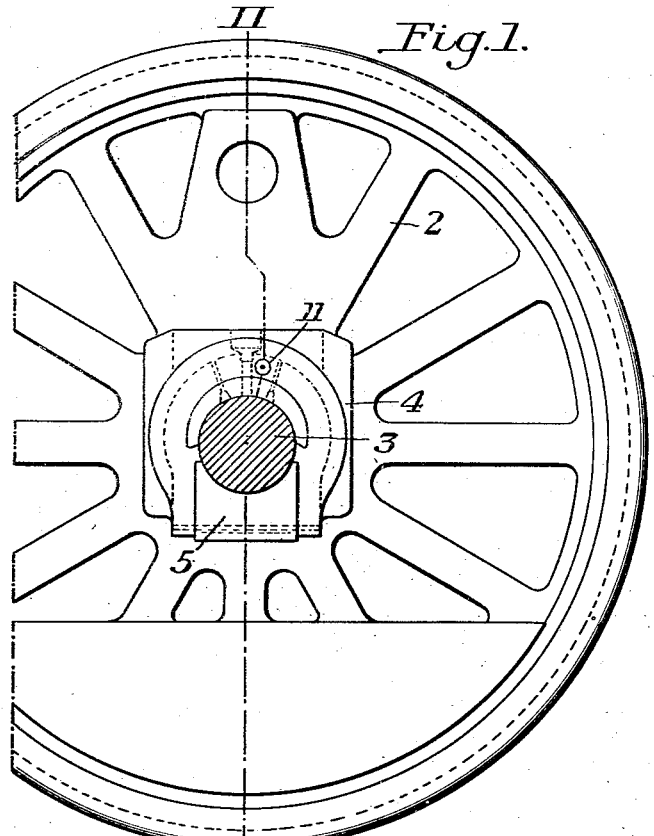
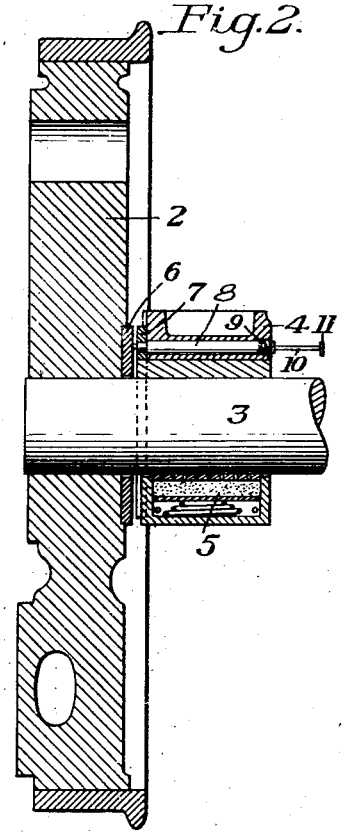
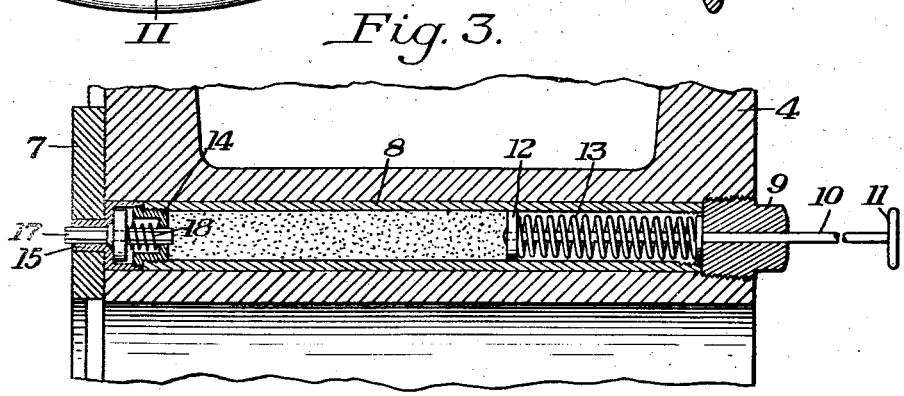
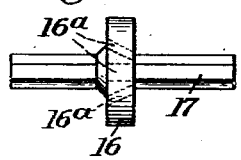
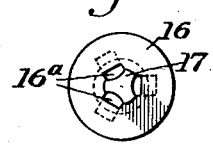
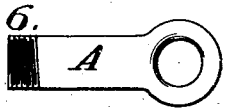
INVENTOR May 22, 1928.  
W. A. O'TOOLE  
1,670,820  
AUTOMATIC LUBRICATOR FOR DRIVING WHEELS OF LOCOMOTIVES  
Filed Oct. 6, 1925  2 Sheets-Sheet 2
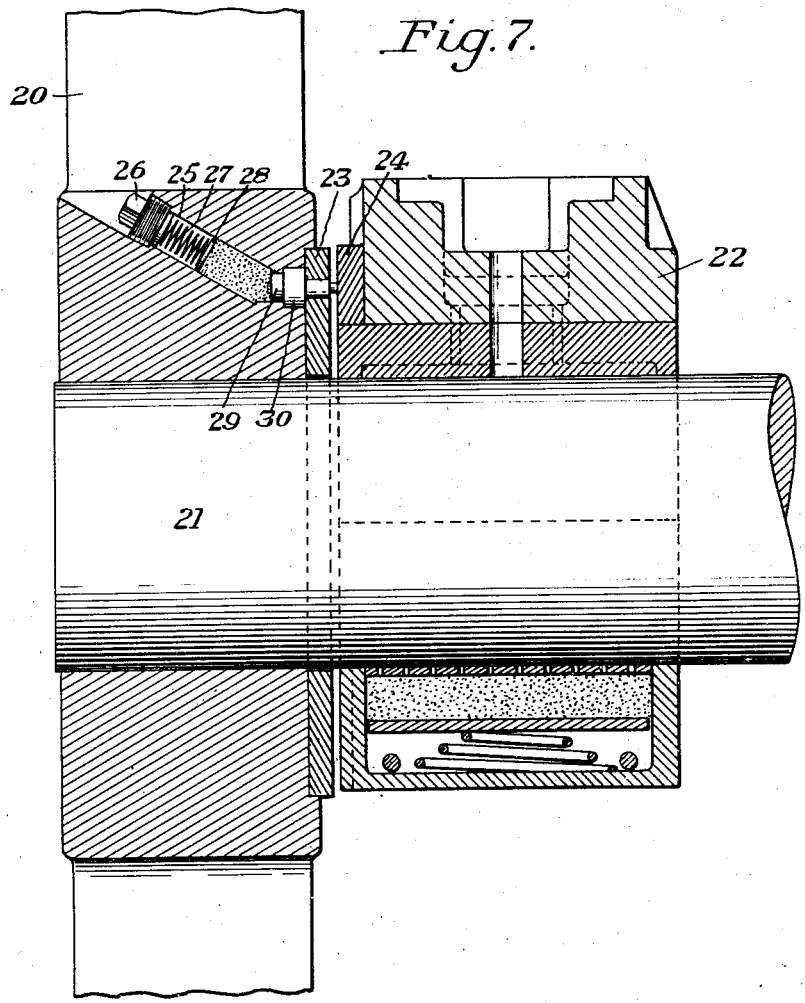
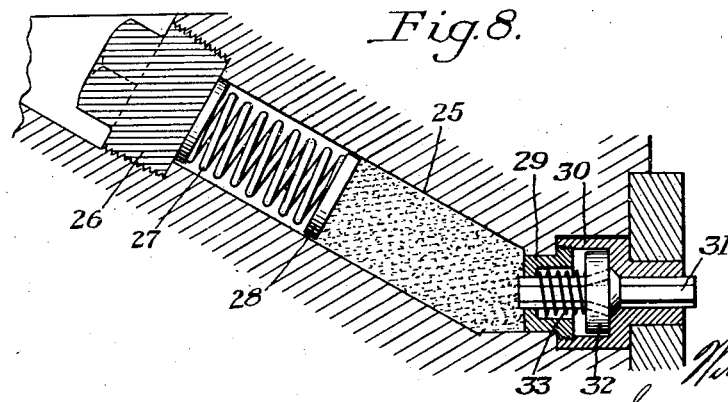

Patented May 22, 1928.

1,670,820

UNITED STATES PATENT OFFICE.

WILLIAM A. O'TOOLE, OF PITTSBURGH, PENNSYLVANIA.

AUTOMATIC LUBRICATOR FOR DRIVING WHEELS OF LOCOMOTIVES.

Application filed October 6, 1925. Serial No. 60,747.

This invention is for a lubricator, and is particularly adapted to the lubrication of the hubs and hub liners of locomotive driving wheels.

It is, of course, commonly known that the driving wheels of locomotives are fast on the axle, and that the shaft has its bearing in what is termed the drive box, which is located in the pedestal or frame of the locomotive just inside the inner face of the wheel. In order to reduce wear and friction between the inner face of the wheel and the adjacent face of the drive box, it is customary to provide a renewable washer or hub liner between the drive box and the inner face of the wheel.

This liner always permits of some side play of the axle in the drive box, and as the plate wears, the side play increases. The parts are subject to continual wear by reason of the fact that all side thrust must be taken up at this point. This side thrust may sometimes be as much as three quarters of an inch.

Heretofore it has been difficult to provide for the proper lubrication of these parts. Any system of lubrication requiring the draining of oil directly from the well in the drive box is wasteful and results in an unnecessary waste of oil. This is true of a system of collecting oil which is carried around by the drive shaft and flowed onto these surfaces.

Any type of oiler should not only be economical, but must be of a construction capable of being applied within the limited available space, and must be accessible for refilling.

According to the present invention, it is proposed to provide a lubricating device which shall supply the lubricant substantially as needed and which is convenient for refilling.

My invention may be readily understood by reference to the accompanying drawings, which illustrate preferred forms of my invention but to the particular construction of which the invention is not confined. In the drawings:

Figure 1 is a transverse section through the drive wheel shaft of a locomotive back of the drive wheel and driving box, the inner face of the driving wheel and drive box being shown in elevation, my invention being embodied in the drive box;

Figure 2 is a vertical section in the plane of line II—II of Figure 1;

Figure 3 is an enlarged detail sectional view through a portion of the drive box and lubricator;

Figure 4 is a side elevation of the valve member of the lubricator, per se;

Figure 5 is a front view of the valve member shown in Figure 4;

Figure 6 is a detail view of a wrench suitable for removing the lubricator;

Figure 7 is an enlarged detail view of a driving wheel hub and drive box, in section, showing my lubricator contained in the hub of the wheel instead of in the drive box;

Figure 8 is an enlarged detail section of the lubricator shown in Figure 7.

Referring to the drawings, 2 designates the driving wheel of a locomotive, 3 is the axle on which the wheel is carried. The drive box is designated 4, and 5 is the usual lubricator for the axle.

On the inner face of the drive wheel is the usual hub liner or washer 6, which is preferably made in sections so as to permit of removal and renewal. This is a standard member and forms no part of the present invention. On the driving box is a cooperating wear plate 7.

As the locomotive travels along, elements 6 and 7 are moved into engagement with each other by the side thrust of the axle. This movement is utilized to advantage in the present invention.

In the form of invention shown in Figure 3, the lubricator is in the drive box. In its preferred form, it includes a tubular container 8 interiorly threaded at each end. This tube is fitted into a bore in the drive box, and is retained in place by a plug 9 screwed into the face of the drive box away from the drive wheel and hereinafter called the outer face.

Passing through the plug 9 is a rod 10 having a handle 11 at its outer end and a plunger 12 on its inner end. The plunger is urged inwardly by a compression spring 13 and is resisted by the lubricant in the tube. A heavy grease is preferably used.

Screwed into the inner end of the tube 8 is a coupling 14 to which is screwed a nipple 15. In the coupling 14 and nipple 15 is a valve member 16 having ports 16ª therethrough and having a fluted stem 17. The end of the stem is normally projected through and beyond the wear plate 7, a spring 18 urging and holding it in this position. When projected forwardly as far as possible, the ports 16ª are closed by reason of the valve being in its seated position.

During the operation of the locomotive, the side thrust of the wheel causes the plate 6 to bear against the projecting end of stem 17, unseating valve 16 and opening ports 16ª. The spring actuated plunger maintains pressure on the heavy oil or grease in the container to force it out around the fluted valve stem 17 and ports 16ª onto the surfaces to be lubricated.

The handle 11 of rod 10 serves as an indicator to show when the container needs refilling. It is accessible to a workman under the locomotive. If the container needs to be refilled, the plug 9 is removed and the wrench number A of Figure 6 screwed into the end of the tube 8. By pulling straight out on the wrench A, the tube 8 and the parts carried thereby may be pulled out of the bore in the drive box, refilled and again inserted.

In the form of the invention shown in Figures 7 and 8, the lubricator is carried in the hub of the driving wheel instead of in the drive box.

In these figures, 20 designates the drive wheel, 21 the axle, 22 the drive box, 23 the removable wear plate on the wheel, and 24 the wear plate on the driving box.

Drilled into the hub of the wheel is a diagonal hole 25 into the upper end of which is screwed a plug 26 which carries a spring 27 on its inner face. This spring bears against, and preferably is secured to a plunger or disk 28 for pressing on the lubricant in the hole. At the inner end of the hole 25 is a horizontal chamber into which is set a coupling 29. Screwed onto the outer end of the coupling 29 is a nipple 30.

Carried by coupling 29 and nipple 30 is a valve similar to that shown in Figure 3, and including a fluted stem 31 and a valve disk 32 having ports therein adapted to be closed when the valve seats against a shoulder in the nipple, as shown. The outer end of the stem normally projects through and beyond the wear ring 23, at which time the valve is closed. Spring 33 tends to maintain this condition.

When, however, the side thrust of the locomotive tends to bring plates 23 and 24 into contact, rod 31 is depressed, opening valve 32 and permitting grease or lubricant to be ejected onto wearing surfaces.

As this form of lubricator may be readily accessible from the exterior of the locomotive, it is not necessary that the grease be contained in a removable sleeve.

From the foregoing it may be seen that the flow of grease is controlled by the pressure of the wearing parts against each other and that lubricant is only supplied as needed.

I claim as my invention:

1. The combination with a wheel member and a journal member having opposed bearing faces between which a slight lateral movement occurs, of means for supplying grease to the opposed bearing surfaces including a grease receptacle in one of the members, a spring closed discharge valve at the inner end of the receptacle, means projected upon the closing of the valve against the bearing surfaces of the opposed members to be depressed by lateral movement thereof, and means in the receptacle tending at all times to eject the grease through the valve.

2. The combination with a wheel member and a journal member having opposed bearing faces between which a slight lateral movement occurs, of means for supplying grease to the opposed bearing surfaces including a grease receptacle in one of the members, a spring closed discharge valve at the inner end of the receptacle, means projected upon the closing of the valve against the bearing surfaces of the opposed members to be depressed by lateral movement thereof, and removable means in the receptacle accessible from the outside of the member in which the receptacle is carried for automatically ejecting the grease through the valve.

3. The combination with a locomotive drive box, of a transverse lubricating chamber extending therethrough and terminating at the side bearing face thereof, a spring closed valve at the side bearing face of the chamber having an outwardly projecting tip portion extending beyond said bearing face, said valve being removable through the chamber, and indicating means extending out of the chamber opposite the valve.

4. The combination with a locomotive drive box member and a drive wheel member, each having a bearing plate opposed to the other, of means carried by one of the members for supplying lubricant to the bearing plates, said means including a chamber in one of the members, an outlet for the chamber terminating in one of the bearing plates, a reciprocable valve in the chamber having a stem portion projecting through the outlet for the chamber, means for yieldably urging the valve shut, and means in the chamber for automatically urging grease in the chamber through the valve.

5. The combination with a locomotive drive box member and a drive wheel member, each having a bearing plate opposed to the other, of means carried by one of the members for supplying lubricant to the bearing plates, said means including a chamber in one of the members, an outlet for the chamber terminating in one of the bearing plates, a reciprocable valve in the chamber having a stem portion projecting through the outlet for the chamber, means for yieldably urging the valve shut, and a spring actuated lubricant ejector in the chamber.

6. The combination with a locomotive drive box having a transverse hole therethrough threaded on the end away from the wheel side of the box, of a removable tube in the hole, a plug screwed into the threaded end of the hole for holding the tube against removal, a discharge nipple at the other end of the tube, and a reciprocable valve in the nipple having an actuating stem projecting beyond the end of the nipple.

In testimony whereof I have hereunto set my hand.

WILLIAM A. O'TOOLE.